US006045904A

United States Patent [19]

Torikoshi et al.

[11] Patent Number: 6,045,904

[45] **Date of Patent: *Apr. 4, 2000**

[54] IMAGE RECORDING MEMBER AND METHOD FOR RECYCLING IMAGE RECORDING MEMBER

[75] Inventors: Kaoru Torikoshi; Tomoo Kobayashi, both of Minami-Ashigara; Tadakazu Edure, Ashigarakami-gun, all of Japan

[73] Assignee: Fuji Xerox Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/972,682

[22] Filed: Nov. 18, 1997

[30] Foreign Application Priority Data

| | | | |
|---|---|---|---|
| Nov. 21, 1996 | [JP] | Japan | 8-310975 |
| Jun. 2, 1997 | [JP] | Japan | 9-144357 |

[51] Int. Cl.[7] .............................. B32B 15/08; B32B 23/08

[52] U.S. Cl. .......................... 428/334; 156/240; 156/247; 156/289; 427/387; 428/335; 428/336; 428/447; 428/450; 428/451; 428/452

[58] Field of Search .................................... 428/332, 334, 428/335, 336, 447, 450, 451, 452; 156/240, 247, 289; 427/387

[56] References Cited

FOREIGN PATENT DOCUMENTS

| | | |
|---|---|---|
| 0 336 394 A2 | 10/1989 | European Pat. Off. . |
| 0 349 141 A2 | 1/1990 | European Pat. Off. . |
| 0 618 509 A1 | 10/1994 | European Pat. Off. . |
| 0 775 943 A1 | 5/1997 | European Pat. Off. . |
| 1-101577 | 4/1989 | Japan . |
| 1-297294 | 11/1989 | Japan . |
| 4-64472 | 2/1992 | Japan . |
| 4-362935 | 12/1992 | Japan . |
| 5-216376 | 8/1993 | Japan . |
| 6-222604 | 8/1994 | Japan . |
| 7-104621 | 4/1995 | Japan . |
| 7-225540 | 8/1995 | Japan . |

*Primary Examiner*—D. S. Nakarani
*Attorney, Agent, or Firm*—Oliff & Berridge, PLC

[57] ABSTRACT

The present invention discloses an image recording member in which a layer containing a setting type silicone resin having a Knoop hardness number of from 1 to 145 on the surface of a substrate made of paper, plastics or the like. Furthermore, this invention discloses a method for recycling an image recording member comprising the steps of contacting the image recording member with the outermost surface of an image releasing member, the outermost layer being formed from a pressure-sensitive adhesive or the like such as hot-melt silicone resin, heating these material and member to transfer a toner from the image recording member to the image releasing member, and separating the image recording member from the image releasing member. Thus, the invention can maintain good fixing of an image forming material with respect to the image recording member, while the image forming material can be removed from the image recording member without damaging the recording surface.

17 Claims, No Drawings

IMAGE RECORDING MEMBER AND METHOD FOR RECYCLING IMAGE RECORDING MEMBER

BACKGROUND OF THE INVENTION

1. Field of the Invention

The present invention relates to an image recording member used for an electrophotographic system, thermal transfer system and the like as well as a method for recycling such image recording member, and more particularly to an image recording member which can be recycled by repeating image formation with an image forming material on such image recording member and removal of the image forming material from the image recording member as well as a recycling method by utilizing such image recording member.

2. Description of the Related Art

Recently, there has been a growing interest in disposal of waste and reducing use of resources as environmental problems in global scope. Thus, disposal of image recording members such as paper, plastic films for overhead projector (OHP) and the like as well as reducing use of wood, petroleum and the like which are resources for the material have become important subjects. As one of countermeasures against wasteful use of resources, recycling of paper once used as waste paper has been developed, without disposal thereof. However, plastic films and the like for OHP use are scarcely recovered. Further, there are a variety of problems in recovery and recycling of such materials. More specifically, there are, for example, problems in leakage of confidential documents or confidential data on business, labor for classifying working of materials according to types of recording materials, practical cost required for recovery thereof, and places for collection and control of recovered materials, and problems of quality of recycled products, cost required for deinking inks or the like contained in the materials recovered with respect to reuse.

If such classified recovery, transportation, collection, and recycling of materials are not efficiently carried out, a large amount of energy is consumed, and resulting in increase in an amount of $CO_2$ which is one of global environmental problems, so that there is a fear of accelerating further the warming phenomenon of the earth's atmosphere.

From the viewpoint of efficient deinking treatment, it is desired to release easily an image forming material such as, toner, and ink from an image recording member such as paper, OHP sheet and the like, while an image forming material must be firmly fixed onto an image recording member to maintain the image recorded. Namely, there is an antinomic relationship between fixability of an image and releasability thereof. Under these circumstances, a variety of manners for removing image forming material from image recording member have heretofore been proposed, but they involve a number of problems in themselves.

The related art will be described in more detail hereinafter.

Japanese Patent Application Laid-Open (JP-A) No. 4-362935 discloses a method for recycling an image recording member in which an image is formed by the use of a near infrared ray color-quenching type image recording member, as an image forming material, in which a color image is extinguishable by irradiating near infrared rays, and disused image is irradiated with near infrared rays thereby allowing to extinguish the color.

However, the invention of Japanese Patent Application Laid-Open (JP-A) No. 4-362935 involves such problems that since such near infrared ray color-quenching type recording material reacts also under natural light, there are problems such that image storability is a question, usable materials are limited and toner color is limited, resulting in poor color suitability, and change in characteristic of the image recording member since sue to remaining of toner binder in the image recording member after color-quenching, resulting in causing trouble of transfer ommission in case of reuse of the material (a phenomenon) that image portions which are not transferred are caused.

In light of drawbacks involved in the invention of Japanese Patent Application Laid-Open (JP-A) No. 4-362935. it is desirable to remove the image forming material itself from an image recording member, rather than quenching the color in the image fording material when the image forming material is reused.

As a manner for removing the image forming material from an image recording member, Japanese Patent Application Laid-Open (JP-A) No. 1-101577 discloses a method for removing toner from the image recording member by the use of an organic solvent. However, the invention of Japanese Patent Application Laid-Open (JP-A) No. 1-101577 involves a safety problem. because the method requires use of an organic solvent.

In addition to the above, Japanese Patent Application Laid-Open (JP-A) Nos. 7-104621 and 7-225540 disclose methods for recycling an image recording member in which the adhesive force between a toner and the image recording member is reduced by employing an aqueous solution containing a surfactant and the like, and then, the image recording member and an image releasing member are heated to transfer the toner to the image releasing member.

However, since these inventions utilize an aqueous surfactant solution being a liquid for reducing the adhesive force between the toner and the image supporting material, there arise such secondary problems that a large amount of energy is required for drying moistened paper, and that because the paper is moistened, the paper rends to wrinkle. Besides, there is also such problem that the contact characteristic between the toner and the image releasing member deteriorates due to the aqueous solution existing between them in the case that the image releasing member is allowed to be in contact with moistened paper, and as a result, the image cannot sufficiently be removed. Such tendency is observed particularly remarkable in the case where solid image, graphics or the like printed on the entire surface of the image recording member is released.

If the toner used is black toner, it is difficult to discriminate dot-like toner remained on the image recording member from printed decimal points and punctuation points after recycling the materials. Furthermore, there is such problem in case of color image that since the image density is high, a surfactant is hard to enter into an interface between the image and the paper, the releasability becomes much more insufficient so that accurate color reproduction cannot be attained after recycling the materials.

According to Japanese Patent Application Laid-Open (JP-A) No. 6-222604, a method for removing easily of an image forming material from the image recording member by reducing adhesion between the image forming material and the image recording member by the use of a resin layer which has been formed on the outermost layer of the image recording member and which swells with water has been proposed.

However, the invention of Japanese Patent Application Laid-Open (JP-A) No. 6-222604 involves such problem that since the image recording member itself becomes hydrophilic, the image forming ability varies with circumstances such as moisture and the like, so that the image quality cannot be maintained, in addition to the above described problems due to water.

Furthermore, according to Japanese Patent Application Laid-Open (JP-A) Nos. 1-297294 and 4-64472, a method for removing an image forming material in which the image forming material is fixed on paper which has been subjected to releasing treatment, and the paper is heated together with a releasing member in case of removing the image, whereby the image forming material is transferred to the releasing member has been proposed. However, the paper which has been subjected to releasing treatment exhibits low intermolecular force with respect co the image forming material which is made essentially from organic polymeric materials, so that the image forming material cannot sufficiently be fixed on such paper, even if heat or pressure is applied to them in the fixing step. In addition, the releasing material used for such releasing treatment has a low adhesiveness and low affinity with a substrate of the image recording member, and as a result, it is difficult to firmly bond the releasing material to a substrate of paper or plastic film for OHP use. Moreover, there are such problems that although increase in thickness of a releasable coating layer is required to exert its releasing effect, such increase in layer thickness results in remarkable decrease in fixing ability of an image forming material with respect to the image recording member, and on one hand, fixability changes significantly dependent upon fixing conditions in a printing device or types of image recording member. On the contrary, there is such problem that decrease in thickness of a releasable coating layer for maintaining fixability of the image forming material results in not only decrease in releasing performance, but also no repeating use of the materials, since the releasing material is released and sealed off together with the image forming material when the image forming material is released. Furthermore, since most of releasing materials exhibit insufficient transparency, there arises such problem that when such releasing material is utilized for an OHP film, the optical transmission thereof decreases, resulting in formation of a dark image or inferior image. Moreover, since such film is formed heretofore by dissolving a releasing material in an organic solvent, or by thermally fusing a releasing material, only a resin having a specified molecular weight or a specified chemical structure can be used for maintaining a good solubility in a solvent or good heat-resistance. Under these circumstances, for example, fluorine-base resins and the like must have been employed heretofore in spite of the fact that they are expensive, only a small number of them can dissolve in an organic solvent, and the workability of them is restricted.

SUMMARY OF THE INVENTION

The present invention has been made to solve the above described problems involved in the prior art.

Accordingly, an object of the present invention is to provide an image recording member which can be recycled safely in home or office without requiring operation by professional workers and without using any organic solvent, and to provide a method for recycling such image recording member.

Another object of the present invention is to provide an image recording member which can maintain good fixing with an image forming material, while the image forming material can be removed without damaging the recording surface of the image recording member, and to provide a method for recycling such image recording member.

A further object of the invention is to provide an image recording member which can be used in an image forming apparatus and the like according to an electrophotographic system or thermal transferring system in which a black-and-white image or color image is formed, and to provide a method for recycling such image recording member.

A yet further object of the invention is to provide an image recording member in which any of paper, coated paper, plastic films, films for OHP use and the like is used as a substrate. and to provide a method for recycling such image recording member.

The present inventors have noticed releasability and adhesiveness of silicone resin, which are conflicting properties to each other, and examined a relationship between fixability (adhesiveness) and releasability (separability) of these silicone resins with the image forming materials.

Silicones may be generally classified into straight-chain silicones and three-dimensionally crosslinked setting type silicones in accordance with the molecular structures thereof.

The properties, i.e. releasability, adhesiveness, heat-resistance, insulation property, as chemical stability and the like of the silicones are determined according to the molecules (organic molecules) bonded to silicon atom, and a degree of polymerization of the silicone resin.

Straight-chain silicone having a low-molecular weight is utilized in the form of silicone oil for insulating oil, liquid coupling, buffering oil, lubricating oil, heat transfer medium, water repellant, surface treating agent, releasing agent, anti-foaming agent and the like. Silicone having a molecular weight of from 5000 to 10000 in siloxane unit exhibits rubber elasticity. Silicone rubber is obtained by adding a variety of additives to such straight-chain silicone (raw rubber), then adding a vulcanizing agent thereto, and curing the mixture by heating. Such silicone rubber is utilized as a variety of rubber materials while maintaining silicone characteristics.

On one hand, silicone prepared principally by polymerizing polyfunctional (tri-, tetra-functional) units exhibits crosslinking structure which is setting type silicone known as polysiloxane. Such setting type silicone resins may be classified according to the molecular weight unit thereof into comparatively low-molecular weight silicone varnish being soluble in an organic solvent and silicone resin or the like having a high polymerization degree.

Furthermore, setting type silicone resins may be classified in accordance with manners of curing reaction into a condensation type, addition type, radiation ray type (ultraviolet ray curing type, electron beam curing type) and the like, while they may be classified into a solvent type and non-solvent type dependent upon manners of coating.

While the setting type silicone resin exhibits essentially releasability and non-compatibility due to a low surface energy derived from Si—O bond, when a degree of cure of the resin or an amount of a releasing agent to be added is adjusted, the adhesiveness and releasability thereof can be controlled. As a result, such silicone resin exhibiting better adhesion as it can be bonded to fluororesins, polyimide resin and the like which are difficult to be bonded by means of an organic-base self-adhesive is also prepared in setting type silicone resins.

The present inventors have noticed setting type silicone resins and studied variously molecular structures of the silicone resins and curing conditions or the like therefor. As a result, it has been found that a certain setting type silicone resins has both the properties of a silicone self-adhesive and a silicone releasing agent. Based on such finding, the above-mentioned problems involved in the prior art can be solved by providing an image recording member in which a layer containing the above described setting type silicone resin is formed on a substrate such as paper, OHP sheet and the like, and by providing a method for recycling such image recording member, and thus, the present invention has been completed.

More specifically, the first aspect of the present invention resides in an image recording member in which a layer containing a setting type silicone resin having a Knoop hardness number of from 1 or more to 145 or less is formed on the surface of a substrate.

Furthermore, the second aspect of the present invention resides in a process for the production or an image recording member comprising the steps of applying a setting type silicone resin precursor on the surface of a substrate, and curing the substrate thus applied to form a film having a Knoop hardness number of from 1 or more to 145 or less on the aforesaid substrate.

Moreover, the third aspect of the present invention resides in a method for recycling an image recording member comprising the steps of contacting the surface of the above described image recording member in which an image has been formed on the surface with an image releasing member in which the outermost layer of the aforesaid image releasing member is made of a material having a higher affinity with an image forming material than that of the image recording member, heating these material and member to transfer the image forming material from the aforesaid image recording member to the image releasing member, and then separating the image recording member from the image releasing member.

Explanation will be made in accordance with electrophotography hereinafter. An image is generally formed on an image recording member in such a manner that electrostatic charge is uniformly applied on the surface of an electrophotographic photoreceptor by means of electrification, and then the surface is exposed to light based on the image information obtained from an original, whereby an electrostatic latent image is formed. Thereafter, when a toner is supplied to the electrostatic latent image on the surface of the photoreceptor from a developing means, the electrostatic latent image is developed to visualize the original image by means of the toner, further the original image is transferred to an image recording member, and finally the toner is fixed on the image recording member by means of heat, pressure and the like.

Accordingly, it is easily understood that when the image recording member is again heated, the toner is molten so that it is easily released from the image recording member in the case where the image has been fixed on the image recording member by means of heat. However, toner remains in an amount that characters or pictorial images can sufficiently be recognized and discriminated on the surface of paper when applied only heat treatment so far as ordinary paper is used as an image recording member. This is because the toner contains a material having a high affinity with paper fibers for the sake of good fixability.

In the present invention, since a layer containing a setting type silicone resin having a suitable hardness is formed on the surface of a substrate, sufficient fixing force can be obtained from cohesive force derived from a toner and intermolecular force acting between the toner and the setting type silicone resin after the image forming material has been fixed.

Namely, an organic polymer material such as styrene-acrylic resin, polyester resin or the like which is mainly used for an image forming material is comparatively soft thermoplastic resin in view of image strength, fixability onto an image recording member, material workability and the like, so that it exhibits a molten state in case of fixing in which such resin is heated and pressed. Since the setting type silicone resin according to the present invention has a Knoop hardness number of from 1 to 145, it is considered that the resin is softened by heating so that it functions like a molten self-adhesive, and hence ic exhibits good adhesion to the image forming material. Thereafter, when the image recording member is cooled to solidify the image forming material to be fixed on the image recording member by means of the cohesive force. In this occasion, setting type silicone resin can be returned to the original state, because of its three-dimensional network.

On the other hand, in case of recycling the image recording member by releasing the image forming material, the image forming material is in a molten state upon heating, i.e., in a state where the cohesive force is smaller than that in setting, so that fixability of the image forming material decreases with to the image recording member decreases to a lower level than that of being solidified. In this case, since an image releasing member having a higher affinity with the image forming material than that of the image recording member, releasability of the setting type silicone resin functions, so that the image forming material can be easily transferred from the image recording member to the image releasing member.

In the present invention, a layer containing a setting type silicone resin is formed on a substrate by means of coating or the like, and then the layer applied on the substrate is cured upon heating (including curing at room temperature), light beam, electron beam and the like to prepare an image recording member. In the curing step, firm bonding is attained between the substrate and the setting type silicone resin, and as a result, the layer containing the setting type silicone resin having an excellent bonding strength is formed on the substrate For this reason, the layer is not easily released from the substrate of the image recording member according to the present invention. even if recycling treatment is repeated.

Furthermore, since the setting type silicone resin is excellent in heat resistance so that it is hard to be affected by a fixing condition in a printing device, the fixability of an image forming material is substantially determined by the intermolecular force between the setting type silicone resin and the image forming material. Accordingly, it is considered that substantially constant fixing performance can be attained irrespective of types of image forming material in the present invention, since image forming materials employed widely have similar characteristics from one another. Moreover, since silicone resins exhibit less deterioration in material by the influence of heat and there is a scarce change in performance due to elapse of time in printing device, and accordingly, substantially constant performance can be maintained over a long period of time.

In addition, when a coating solution containing such setting type silicone resin is diluted, a uniform thin layer is easily obtained. Thus, in the case where paper is used as a substrate, when the setting type silicone resin is formed in a thin layer in such a degree that irregularities existing on the surface of the paper are not perfectly covered therewith, the fixability thereof can be improved by a so-called anchoring effect which appears due to the fact that toner enters into the irregularities on the image recording member.

Because of the reasons as mentioned above, it becomes possible that fixing and releasing steps of image forming material are repeated in the image recording member according to the present invention.

DETAILED DESCRIPTION OF THE PREFERRED EMBODIMENTS

The image recording member being capable of recycling and the method for recycling such image recording member according to the present invention will be described in more detail hereinafter.

In the image recording member according to the present invention, a layer containing a setting type silicone resin is formed on the surface of a substrate. An example of the substrates which may be used for the present invention includes paper (such as ordinary paper, and coated paper and the like), metals (such as aluminum and the like), plastics, and ceramics (such as alumina and the like). The shape of such substrate is not specifically limited, but film-shaped material is desirable.

In case of employing paper as substrate, an example of raw material pulp includes, in the form of chemical pulp, a virgin bleached chemical pulp which is prepared by treating chemically wood such as hardwood bleached kraft pulp, hardwood unbleached kraft pulp, hardwood bleached sulfite pulp, conifer bleached kraft pulp, conifer unbleached kraft pulp, conifer bleached sulfite pulp, and soda pulp as well as other fiber materials, and bleaching the resulting material created. Among others, a chemical pulp having high whiteness is preferred. On one hand, an example of waste pulps includes a waste pulp obtained by dissociating unprinted waste paper such as first-class white, special-class white, intermediate-class white, and lower-class white paper which are obtained in bookbinderies, printeries, and cutting factories; and a waste pulp obtained by dissociating waste paper being wood free paper, wood free coated paper, medium duty paper, medium duty coated paper, and low grade printing paper on the surfaces of which have been printed by lithographic, letterpress, or intaglio-printing, and printing in accordance with electrophotographic, heat-sensitive, heat-transfer, pressure-sensitive recording or ink-jet recording method, or with the use of carbon paper, waste paper on the surfaces of which have been written down by the use of water-color ink, oil-color ink, or pencil, and newspaper waste paper, and thereafter deinking these waste paper in accordance with the optimal manner, respectively. Among others, preferable is a waste pulp having high whiteness and containing less foreign elements.

An example of plastic films which may be used as a substrate in the present invention includes a polyethylene film, polypropylene film, polyester film and the like. On one hand, an example of plastic films having a good optical transmittance which may be used for OHP includes an acetate film, cellulose triacetate film, nylon film, polyester film, polycarbonate film, polystyrene film, polyphenylene sulfide film, polypropylene film, polyimide film, cellophane and the like. In the existing circumstances, polyester film is preferable from the collective viewpoints of mechanical, electrical, physical and chemical characteristics; workability and the like, and particularly biaxially oriented polyethylene terephthalate film is widely employed.

Plastic film is usually transparent, but it may be opaque in order to obtain the same feeling as that of paper. As a manner for making a plastic film opaque, a method for mixing a white pigment, for example, fine particles of metal oxides such as silicon oxide, titanium oxide, calcium oxide and the like; an organic white pigment, polymer particles or the like into the plastic film may be used. Alternately, when the surface of a plastic film may be sandblasted, or embossed, the surface of the plastic film is roughened, so that the plastic film is opaque due to light scattering derived from the roughened surface.

For the purpose of obtaining a uniform and thin coating of a coating solution to form a setting type silicone resin on the surface of a paper, sealing coat may be applied to the paper, since liquid penetrates easily into the paper due to the porosity thereof in case of employing paper as a substrate.

Such sealing coat is achieved by previously coating a solution prepared by dissolving or dispersing polyethylene, clay binder, PVA, starch, carboxymethylcellulose and the like into a solvent on a paper, and drying the same co form a film on the paper.

For preventing from deterioration in image due to environmental conditions such as temperature, humidity and the like in case of employing plastic film as a substrate, it is preferred that a surface resistivity of an image recording member after forming a layer on the recording material, which will be mentioned hereinafter, is within a range of from $1\times10^8$ to $1\times10^{13}$ Ω (in the condition of 25° C., 65% RH). To that end, a surfactant, conductive metal oxide fine particles and the like may be applied to the substrate.

An example of materials for conductive metal oxide particles includes ZnO, TiO, $TiO_2$, $SnO_2$, $Al_3O_3$, $In_2O_3$, SiO, $SiO_2$, MgO, BaO and $MoO_3$. In addition, metal oxides containing further different elements are preferable. For example, preferable are those obtained by doping ZnO with Al, In or the like; TiO with Nb, Ta or the like; and $SnO_2$ with Sb, Nb, a halogen element or the like. Among others. $SnO_2$ doped with Sb is particularly preferred, since it is highly stable, i.e., there is a slight change in the conductivity thereof with age. They may be used alone or in combination of two or more of them.

As a setting type silicone resin contained in the layer. a resin hating a Knoop hardness number of from 1 to 145 is used. More specifically, a layer containing a setting type silicone resin means the resin layer having a structure obtained by bonding three-dimensionally a polysiloxane resin skeleton to another polysiloxane resin skeleton produced through the reaction of a plurality of reactive (crosslinkable) substituents bonded to the former resin skeleton in which a precursor consisting of a polysiloxane precursor having a plurality of reactive substituents and a curing agent (polymerization initiator), if required, is applied to a substrate to obtain such resin layer. In this case, the polysiloxane precursor itself may have self-crosslinkability. An example of the above described substituents includes vinyl group, carboxyl group, hydroxyl group, alkoxy group, epoxy group, amino group, halogen atoms and the like. When the Knoop hardness number is less than 1, the resulting layer exhibits insufficient strength, while when the Knoop hardness number exceeds 145, adhesive properties or adherability of the layer to an image forming material become insufficient. As a result, preferable is that a Knoop hardness number ranges from 10 to 100.

Knoop hardness number is an indication for determining hardness of a material in which a fine indenter made of a hard material such as diamond is pressed against a material to be measured, and a hardness of the material is determined from a size of the resulting indentation. Depending upon contour of an indenter to be pressed, the resulting hardness is expressed as Vickers hardness or Knoop hardness. In case of Knoop hardness number, a wedge type indenter is used, and this method is utilized principally for hardness examination or the like for a soft material.

Setting type silicone resins which can be used for the present invention are classified into solvent type and non-solvent type resins based on a coating manner thereof. Furthermore, these resins may be classified into addition type, condensation type. UV type and the like dependent upon types of the reaction therefor.

As condensation polymerization type resins, there are the one synthesized in accordance with such a manner that polysiloxane containing silanol groups at the terminals thereof such as polydimethylsiloxane is used as a base polymer to which is added polymethylhydrogen siloxane or the like as a crosslinking agent, and the resulting mixture is condensed by heating the same in the presence of an organic metallic salt such as organic tin catalyst or amines and the like; the one synthesized by reacting polydiorganosiloxane containing reactive functional groups such as a hydroxyl group, alkoxy group and the like at the terminals thereof; and the like resins.

Polysiloxane can be synthesized by condensing chlorosilane of tri- or higher functionality or a mixture consisting of such chlorosilane and another chlorosilane of mono- or di-functionality together with hydrolyzed silanol. Condensation type resins may be classified into solvent type and emulsion type resins dependent upon the form thereof.

Addition polymerization type resins are prepared by such a manner that polysiloxane containing vinyl group such as polydimethylsiloxane is used as a base polymer to which is added polydimethylhydrogen siloxane as a crosslinking agent, and the resulting mixture is reacted and cured in the presence of a platinum catalyst. These resins may be classified into solvent type, emulsion type, and non-solvent type resins dependent upon the dissolving form thereof.

As UV curing type resins, the one in which an optical cationic catalyst is used, and the one in which a radical curing mechanism is utilized have been known. Although such UV curing type resin is basically applied in a non-solvent coating manner. it may also be applied in such a manner that a resin is diluted in a solvent, and the resulting diluted solution is applied on a substrate for the sake of controlling a layer thickness, and UV irradiation is made upon the coated substrate after drying the layer.

Moreover, modified silicone resins prepared by reacting low-molecular weight polysiloxane having hydroxyl groups or alkoxy groups bonded to silicon atom with alkyd resin, polyester resin, epoxy resin, acrylic resin, phenol resin, polyurethane, melamine resin or the like may be employed.

In order to control a degree of cure in a resin, there are manners of adding polydimethyl siloxane of mono- or di-functionality, adjusting amount of catalyst, reaction temperature, reaction time, intensity of UV irradiation, and controlling a condition of curing reaction by adding, as a reaction retarder, acetylene alcohols, cyclic methylvinyl cyclosiloxane, siloxane modified acetylene alcohols or the like.

When these curing conditions (such as type of reaction group, number of reaction group, curing time, temperature, intensity of radiation energy and the like) are controlled, the molecular weight of a setting type silicone resin, the remaining amount of silanol as a reaction group and the like change, so that releasability, hardness, adhesion, surface hardness, transparency, heat resistance, chemical stability and the like as the characteristic properties of the silicone resin can be controlled.

An example of such setting type silicone resins as described above includes a resin having a weight-average molecular weight of from 10,000 to 1,000,000, a resin in which a molar percentage of phenyl group in the whole organic groups ranges from 0.1 to 50. a resin having from mono- to tetra-functionality, and the like resins.

The layer in the present invention may contain a modified silicone oil having reactive groups in the molecule thereof and/or a non-silicone compound at a degree where releasing performance of the resin mixture is not deteriorated.

An example of the modified silicone oils which can be used in the present invention includes amino-modified silicone oil, epoxy-modified silicone oil, carboxyl-modified silicone oil, carbinol-modified silicone oil, methacryl-modified silicone oil, mercapto-modified silicone oil, phenol-modified silicone oil and the like. Other examples include silicone oils of dimethyl polysiloxane or methylphenyl polysiloxane type, methylhydrogen silicone oil, fluorine-modified silicone oil and the like. They may be used alone or in combination of two or more of chem.

Furthermore, an example of the non-silicone compounds which can be used in the present invention includes acrylic resin, methacrylic resin, polycarbonate resin, epoxy resin, polyester resin, styrene resin, styrene-propylene resin, styrene-butadiene resin, styrene-vinyl chloride resin, styrene-vinyl acetate resin, styrene-acrylic ester resin. styrene-methacrylic ester resin and the like. These non-silicone compounds may be used in accordance with such a manner that any monomer of the compounds is subjected to curing reaction together with a radical polymerization initiator, an ionic polymerization initiator or the like in the presence of any of the above described silicone resin or the monomer thereof.

In the case where there is such a fear that a substrate such as a paper or the like becomes transparent because of existence of a layer containing a setting type silicone resin, so that feeling or whiteness of the paper is deteriorated, fine particles of a metal oxide such as silicon oxide, titanium oxide, calcium carbonate and the like; organic white pigment, polymer fine particles or the like may be added to the layer for maintaining whiteness of the substrate. Alternately, it may be intended to whiten a layer containing a setting type silicone resin by affording irregularity on the surface of the layer so that scattering of light occurs due to the irregularity in accordance with such a manner that when a substrate is covered with a setting type silicone resin and then, the resulting layer is cured, the layer is closely brought into contact with a base material having an irregular surface, or such a manner that the surface of a layer is sandblasted after the layer is cured.

It is desirable to add a matting agent to a layer in order to improve transporting characteristic thereof.

An example of the above described matting agents includes polyolefins such as polyethylene as well as fluoroplastics such as polyvinyl fluoride, polyvinylidene fluoride, and polytetrafluoroethylene (Teflon) and the like. A specific example of these polymers includes low-molecular weight polyolefin-base waxes (example: polyethylene-base wax), high-density polyethylene-base wax, paraffin-base or microcrystalline waxes. An example of the fluororesins includes polytetrafluoroethylene (PTFE) dispersion. Among them, low-molecular weight polyolefin-base waxes (usually, a molecular weight of from 1000 to 5000) are preferred. Furthermore, the matting agents other than those described above such as inorganic fine particles such as $SiO_2$, $Al_2O_3$, talc and kaolin as well as bead-like plastic powders such as cross-linking type PMMA, polycarbonate, polyethylene terephthalate, and polystyrene may be simultaneously used with any of the above described former matting agents.

A mean particle diameter of the above described resin matting agent is preferably within a range of from 0.1 to 10 μm, and particularly preferable is within a range of from 1 to 5 μm. Although a larger mean particle diameter of the resin matting agent is preferred, when exceeded 10 μm, the matting agent drops off from the layer to cause a dusting phenomenon, so that the surface of the layer is easily worn and damaged, and further clouding (haze degree) of the layer increases. On the other hand, when the above described mean particle diameter is less than 0.1 μm, it is difficult to function as a matting agent.

It is preferred that the above described matting agent is flat-shaped. In this respect, a matting agent which has been previously arranged in a flat shape may be used, or such a manner that a matting agent having a comparatively low softening temperature (for example, from 30° C. to 100° C.) is used and such matting agent is allowed to be flat-shaped when a layer is applied on a substrate and it is dried under heating, or such a manner that a matting agent is allowed to be flat-shaped while pressing the same under heating may be practiced. Preferable is to protrude a matting agent from the surface of the resulting layer.

It is preferred that a content of the setting type silicone resin contained in a layer is 30% by weight or more, and more preferable is 50% by weight or higher. If a content of such setting type silicone resin is 30% by weight or less, releasing performance of the resin becomes insufficient.

Moreover, a content of the non-silicone compound contained in a layer is preferably 50% by weight or less from the viewpoint of releasability, and more preferable is 30% by weight or less.

On one hand, a content of the matting agent contained in a layer ranges preferably from 0.1 to 10% by weight, and more preferable is from 0.5 to 5% by weight.

While a thickness of a layer is not specifically limited, the layer is generally used in a thickness of from 0.1 μm to 100 μm, and preferable is from 1 μm to 20 μm. In the case where a substrate is a sheet, it is preferred that a coating weight (solid content) is 5 $g/m^2$ or less for attaining the above described anchoring effect.

The above described layer can be formed by such a manner that a silicone resin or the like (a setting type silicone resin precursor) before curing is dissolved in an organic solvent, or the silicone resin is not dissolved in a solvent, but it is in the original state so far as it is a non-solvent type resin, and either the solution or the resin is applied to a substrate, or a substrate is impregnated with the solution or the resin.

A manner for the application or the impregnation of a resin or a solution may be the one which is usually employed and an example of which includes blade coating method, (wire) bar coating method, spray coating method, dip coating method, bead coating method, air-knife coating method, curtain coating method, roll coating method and the like.

For drying a layer, wind, heat and the like may be utilized. As a specific manner for drying such layer, those usually applicable may be employed, they are, for example, a manner for placing a layer in an oven, a manner for passing a layer through an oven, a manner for contacting a layer with a heated rollers and the like manners.

For curing a layer prepared after drying the same, heat, light beam, electron beam and the like can be utilized. In this case, an additive such as a polymerization regulator for controlling such curing reaction, and a plasticizer may be mixed with a coating solution. On one hand, a layer may be cured without any treatment, if curing reaction of the layer proceeds at room temperature. In case of thermal curing of a layer, steps for drying and curing may be carried out at the same time. In case of curing a layer by means of light beam, electron ray or the like, curing may be conducted either by utilizing, for example, tungsten filament lamp, high-pressure or low-pressure mercury vapor lamp or the like as a light source, or by irradiating light beam of around 100 to 200 W/cm for a period of around 1 minute.

On the other hand, the outermost surface of an image releasing member used for the purpose of releasing is formed with a material having higher affinity with an image forming material than that of a setting type silicone resin. The affinity with such image forming material can be evaluated by, for example, solubility parameter (SP value) which is derived from a partial structure unit of chemical structural formula. Substances each having the closer SP value, i.e., having more similar chemical structural formula to each other exhibit the higher affinity, in its turn, the higher compatibility.

Such image releasing member can be produced by either forming the whole image releasing member with a variety of heat-resistant metals, metal oxides and the like having high affinity with an image forming material, or forming a coating layer made of a material having high affinity with the image forming material on a substrate.

An example of materials each having high affinity with the image forming material is a thermoplastic material. It is preferred that such thermoplastic resin is the same material as that used for the image forming material. An example of the thermoplastic materials includes styrene-base resins being homopolymers, copolymers and the like of styrene, and para-chlorostyrene; vinyl-base resins being homopolymers, copolymers and the like of methyl acrylate, methyl methacrylate and the like; olefin-base resins being homopolymers, copolymers and the like of ethylene, and propylene; epoxy resin; polyester resin; polyurethane resin; polyamide resin; cellulose resin and the like.

In order to deal with a variety of image forming materials by the use of one or several types of releasing members, use of a material which can maintain affinity with image forming material over a wide temperature range is desirable. A typical example of such materials is pressure-sensitive adhesives (self-adhesives). An example of pressure-sensitive adhesives (self-adhesives) includes rubber-base pressure-sensitive adhesives, acryl-base pressure-sensitive adhesives, vinyl ether polymer-base pressure-sensitive adhesives, and silicone pressure-sensitive adhesives. Among them, silicone pressure-sensitive adhesive is desirable in view of such facts that it has good heat resistance being applicable at a temperature at which an image forming material is heated and molten, and that it exhibits good affinity with the setting type silicone resin in image forming material as well as it can maintain compatibility of fixability with releasability of such image forming material in the repeated use thereof over a long period of time.

Other materials having high affinity with the image forming material than those described above are a variety of heat-resistant metals which can be used also as a base material of releasing member, for example, aluminum, nickel, platinum, zinc, copper, iron, stainless steel and the like; alloys obtained from these metals; materials obtained by subjecting oxidation treatment to each surface of these metals: and sintered materials of aluminum oxide, titanium oxide, zirconium oxide, calcium phosphate, barium titanate and the like. Furthermore, resins of heat-resistant polyimide, polyamide, polycarbonate, polyphenylene sulfide, polyethylene terephthalate and the like as well as films and the like prepared from these resins can also be effectively employed.

In the image formed on an image recording member, there are irregularities due to an image forming material, and each of such irregularities has a size of from 20 to 30 μm in case of comparatively large size. It is preferred that the surface of a releasing member has such a degree of irregularities which can follow the former irregularities. In reality, since a releasing member has been bonded to an image recording member while applying a pressure thereto, the outermost layer of the releasing member having flowability can closely contact the image, but there is a case where air layers lie between the outermost layer and the image forming material from a microscopic point of view, so that there is insufficient close contact between them. In this respect, it is desirable that the surface of releasing member has each of irregularities of around several μm in order to obtain a more sufficient effect. Such irregularities can be formed by adding fine particles to the outermost layer of an image releasing member prepared from a resin or the like. Such fine particles produce local pressure and functions to bring the major component material in a surface layer material into further close contact with an image forming material.

An example of materials of such fine particles includes those prepared from titanium oxide, aluminum oxide, aluminum sulfate, zirconium oxide, barium titanate, silica, talc, clay (kaolin), calcium carbonate, silicone resin, acrylic resin, styrene resin, styrene-acrylic resin, melamine resin, benzoguanamine resin, melamine-benzoguanamine resin, polyolefin resin and the like; and particularly preferable are fine particles of silicone resin and acrylic resin.

Shapes of such particles are not limited so far as a very small amount of irregularities can be applied to the surface of image releasing member, and hence, an example of the shapes includes sphere, (flat) ellipse, doughnut-shape, cube, indeterminate shape and the like. A size of such particle ranges from 0.5 μm to 20 μm along the diameter or the longitudinal direction thereof, and preferably it ranges from 1 μm to 15 μm.

While a content of fine particles contained in the resin at the outermost layer is dependent upon a material and a size of such fine particles, 5 to 50% by weight is desirable.

When a resin material having a crosslinking structure is used for the outermost layer of an image releasing member, the outermost layer exhibits elastic layer-like function, but there is a case where such elastic layer-like function does not appear sufficiently dependent upon types and film thicknesses of the resin used, so that such resin cannot follow irregularities on the surface of image. In this case, there is a manner in which a base material itself of image releasing member is allowed to be an elastic member, or a manner for providing an elastic layer on the base material as a method for permitting the outermost layer to follow irregularities on the image surface of an image recording member. An example of materials for such elastic layer includes natural rubber, isoprene rubber, butadiene rubber, 1,2-polybutadiene, styrene-butadiene rubber, chloroprene rubber, nitrile rubber, butyl rubber, ethylene-propylene rubber, chlorosulfonated polyethylene, acrylic rubber, epichlorohydrin rubber, polysulfide rubber, silicone rubber, fluororubber, urethane rubber and the like. When it is supposed that such elastic layer is utilized as a heating medium, heat-resistance is required so that silicone rubber is desirable as a material used for such elastic layer. Silicone rubber is classified broadly into millable type and liquid type rubbers. Examples of millable type silicone rubber are those prepared in accordance with such a manner that a straight-chain polyorganosiloxane having a high degree of polymerization such as dimethyl-base, methylvinyl-base, methylphenylvinyl-base, methylfluoroalkyl-base and the like base silicone rubber is used as a major raw material with which are incorporated a reinforcing filler and a variety of additives, then a vulcanizing agent is added thereto, and the resulting mixture is cured by heating. Liquid type silicone rubber includes a condensation type rubber which is cured at room temperature; an addition type rubber which is cured by heating in the presence of a platinum-base catalyst; an ultraviolet ray curing type rubber and the like rubbers.

In order to remove an image for recycling by the use of the image releasing member thus produced, the surface on which the image has been formed by means of an image recording member is brought into contact with the image releasing member, then, this material and the member are heated to transfer the image forming material to the image releasing member, and thereafter they are separated from each other. In the above case, the material and the member may be pressed upon heating.

Application of a method for removing an image forming material from the image recording member on which an image has been formed is not limited to an electrophotographic method, but it is most effective in principle to apply such method to a device for effecting the electrophotographic method as mentioned above. In this case, when the device is modified in such that fixing of the image forming material or releasing of the image forming material can be selectively conducted in the final step of the electrophotographic method, the method for recycling an image recording member according to the present invention can be practiced in an electrophotographic copying machine serving for a double purpose of an image recording device and an image removing device, so that effective use of space can be achieved.

EXAMPLES

The present invention will be described in more detail hereinafter in conjunction with examples, but the invention is not limited thereto. It is to be noted that "part(s)" appeared in Examples and Comparative Examples is represented by "part(s) by weight", respectively.

Example 1

<Production of image Recording Material>

A thermosetting type silicone resin coating solution was prepared by diluting 1 part of a thermosetting type silicone resin (trade name: YR3286 containing 2% of benzoyl peroxide (BPO), manufactured by Toshiba Silicone Co.) with 2 parts of toluene. 1.0 $g/m^2$ of the resin solution was dropped on a copying paper for electrophotography (A4 size recycled paper: R-paper manufactured by Fuji Xerox Co., Ltd.), and coated with a wire bar so as to obtain a uniform layer thickness. After coating. the layer was dried at room temperature for 10 minutes, and then, thermal curing reaction was conducted by means of a hot-air drying equipment at 120° C. for 1 hour to prepare an image recording member on which a silicone cured film had been formed.

In this case, since it is difficult to correctly measure a layer thickness of the silicone resin cured layer on the R-paper, measurement was effected in accordance with such manner that a polyethylene terephthalate (PET) film having 100 μm thickness was coated with the silicone resin at the same condition, dried, cured, and then, a layer thickness of the resulting cured layer was measured by means of a coating thickness profilometer. Furthermore, about 10 mm square piece was cut off from the image recording member, and the surface hardness of which was measured by means of a microhardness meter. and Knoop hardness number was calculated in accordance with the following equation.

$$\text{Knoop hardness number}=P/0.07028\times L^2$$

wherein P is a load (Kg: 0.03 Kg was used), and L is a length (mm) of the diagonal line in the sample indented by an indenter, respectively.

As a result, the layer thickness and the Knoop hardness number of the cured layer were 10 μm, and 10.3, respectively.

<Method for Production of Image Releasing Member>

A stainless steel roll on the surface of which had been formed a silicone rubber layer of 0.6 mm was used as a base material.

750 parts of silicone self-adhesive (trade name: TSR1520A manufactured by Toshiba Silicone Co.) and 7.5 parts of a cross-linking agent therefor (trade name: TSR1520B manufactured by Toshiba Silicone Co.) were introduced into 1030 parts of toluene, the resulting mixture was agitated and admixed. to which were further added 220 parts of a thermoplastic silicone resin powder (trade name: XR39-B1676 manufactured by Toshiba Silicone Co.), as a release type material, and the admixture was dissolved to obtain a coating solution. The resulting coating solution was applied on the silicone rubber layer to form the outermost layer having 30 μm thickness.

<Evaluation of Fixability>

In an electrophotographic image forming machine "Vivace 550" manufactured by Fuji Xerox Co., a black-and-white image including solid image was printed on the above described image recording member, and then, fixability in this black-and-white image was evaluated. Fixability of image was indicated by a ratio of the image density after peeling to the image density before peeling (image density after peeling/image density before peeling, hereinafter referred to simply as "OD ratio") in the case where a commercially available adhesive cellophane tape (Cellophane Tape manufactured by Nichiban Co.) having 18 mm width was bonded to the solid image portion of the fixed image having a density of about 1.8, when measured by means of X-Rite 938 densitometer (manufactured by X-Rite Co.), with 300 g/cm linear pressure, and then, the tape was peeled off at a rate of 10 mm/sec. It is required that fixability in an image forming material is 0.8 or more in OD ratio as far as the material is to be used in an image recording member for electrophotography.

Thereafter, the image was removed to recycle an image recording member. For recycling the image recording member, a modified type electrophotographic image forming machine in which the heating roller of a fixing device in the above described Vivace 550 machine is replaced by the image releasing member produced, and further a blade for scraping image forming particles peeled off from the image recording member to collect the same on the image releasing member is provided was employed.

In the present example, the image recording member on which an image had been recorded was passed through the fixing device in the modified type Vivace 550 machine. A remaining amount on a recycled paper after removing the image forming material was evaluated by OD ratio as in the case of evaluation of fixability for image forming material. As an image density in which a remaining amount may be ignored, a value of 0.08 or less in OD ratio is desirable.

Furthermore, fixability of an image forming material and a remaining amount on a recycled paper were evaluated after the above described image recording and recycling steps were repeated ten times. The results obtained are shown in Table 1.

Example 2

An image recording member was prepared in accordance with the same manner as that of Example 1 except that an OHP sheet was employed in place of the R-paper, the OHP sheet [trade name: OHP sheet for monochrome use manufactured by Fuji Xerox co. (conductive treatment was applied to the substrate by the use of metal oxide fine particles and the like)] having the same size as that of the R-paper. A layer thickness and Knoop hardness number of a thermosetting type silicone resin layer were 10 μm, and 10.5. respectively. Further, as a result of measuring a surface resistivity of the image recording member on the layer forming side, it was $1\times10^{10}$ Ω. An image was printed on the image recording member in Vivace 550 machine in accordance with the same manner as that of Example 1. Fixability and image releasability thereof were evaluated, and the results thereof are shown in Table 1.

Comparative Example 1

A coating solution was prepared by employing a hot-melt silicone resin (trade name: XC99-A5263 manufactured by Toshiba Silicone Co.) to dissolve the same into ethyl acetate so as to obtain 10% by weight solid content ratio. An image recording member on which a hot-melt silicone layer had been formed was prepared by applying 2.0 g/m of the silicone resin solution on an R-paper, and the coated film was dried at 100° C. for 10 minutes in accordance with the same manner as that of Example 1. To measure a layer thickness, although the coating solution was applied to PET as in the case of Example 1, the PET film repelled the coating solution, whereby a uniform film was not obtained, so that the layer thickness and Knoop hardness number could not be determined. Thereafter, image printing was tried on the image recording member in which a layer had been formed on R-paper in Vivace 550 machine as in the case of Example 1. but because of poor fixability of the image forming material to the image recording member, there arose an offsetting phenomenon to a fixing roll (it means that the image forming material does not fix onto image recording member, but the former material adheres on the fixing roll), so that the image could not be fixed on the image recording member.

Comparative Example 2

Coating of 1.0 g/m$^2$ of a hot-melt silicone resin solution was tried in accordance with the same manner as that of Comparative Example 1 except that a black-and-white OHP sheet manufactured by Fuji Xerox Co. was used in place of the R-paper.

However, the OHP sheet repelled the coating solution, so that a uniform layer could not be formed. Furthermore, image printing was tried in Vivace 550 machine as in the case of Comparative Example 1. However, the paper could not be transported because of releasability of the OHP on which a layer had been formed.

Example 3

A photo-setting type silicone resin coating solution was prepared by adding 1 part of isopropyl alcohol to 1 part of a photo-setting type silicone resin solution (manufactured by Natoco Paint Co.), and diluting the resulting mixture. 1.0 g/$m^2$ of the coating solution was dropped on an R-paper to be coated by means of a wire bar in such that the solution becomes uniform, the R-paper so coated was permitted to stand for some time at room temperature, and then it was subjected to ultraviolet ray irradiation by means of an ultraviolet-ray irradiating apparatus with a 160 W/cm irradiation intensity at about 20 cm irradiation distance for 30 seconds, whereby an image recording member in which a photo-setting type film had been formed on a substrate was prepared. As in the case of Example 1, an image recording member on which the photo-setting type silicone resin layer had been formed was prepared by applying the photo-setting type silicone resin coating solution to PET. and drying and then. light-irradiating the PET thus coated at the same condition as that of Example 1. A layer thickness and a Knoop hardness number of the resulting photo-set layer were 5 $\mu$m and 29.7, respectively In an electrophotographic image forming machine "Acclor 935" manufactured by Fuji Xerox Co., a color image including solid image was printed on the above described image recording member. Evaluation of fixability and releasability of an image forming material was made in accordance with the same manner as that of Example 1 (by the modified Vivace 550 machine). For the evaluation of fixability and releasability. process black was employed as the image forming material. Furthermore, since binder resins are different from each other in black-and-white image forming materials and color image forming materials, the viscoelastic behavior thereof differ from each other. For this reason, releasing temperature for color Image was determined at 110° C. at which the best result of releasability was attained. The results obtained are shown in Table 1.

Example 4

A color image recording member in which a photo-setting type silicone resin layer had been formed on a substrate was prepared in accordance with the same manner as that of Example 3 except that a black-and-white OHP sheet, having the same size as that of the following R-paper, manufactured by Fuji Xerox Co. was employed in place of the R-paper. A layer thickness and a Knoop hardness number of the photo-setting type silicone resin layer were 5 $\mu$m and 22.3. respectively. As a result of measuring a surface resistivity of the image recording member on the layer forming side, it was $2.5\times10^{10}$ Ω. Image printing was made on this image recording member in accordance with the same manner as that of Example 3, and fixability and image releasability thereof were evaluated. The results obtained are shown in Table 1.

Example 5

An image recording member in which a photo-setting type layer had been formed on a substrate was prepared in accordance with the same manner as that of Example 3 except that 0.3 part of an amino-modified silicone oil (trade name: TSP4705 manufacture by Toshiba Silicone Co.) was added to the photo-setting type silicone coating solution of Example 3. As in the case of Example 3, an image recording member on which a photo-setting type silicone resin layer had been formed was produced by applying the photo-setting type silicone resin coating solution to a PET, and drying and then light-irradiating the PET thus coated at the same condition as that of Example 5. A layer thickness and a Knoop hardness number of the photo-set layer were 6 $\mu$m and 18.2, respectively. Furthermore, image printing was made in accordance with the same manner as that of Example 3, and fixability and image releasability thereof were evaluated. The results obtained are shown in Table 1.

Example 6

An image recording member was prepared in accordance with the same manner as that of Example 3 except that 0.5 part of a crosslinking type PMMA matting agent (trade name: MR-2G-20-5 manufactured by Sohken Kagaku Co., Ltd.; average particle diameter: 3 $\mu$m) was added to the photo-setting type silicone resin coating solution of Example 3. A layer thickness and a Knoop hardness number of the photo-set layer were 6 $\mu$m and 22.6, respectively. As a result of measuring a surface resistivity of the image recording member on the layer forming side, it was $6.5\times10^{10}$ Ω. Image printing was made on this image recording member in accordance with the same manner as that of Example 3, and fixability and image releasability thereof were evaluated. The results obtained are shown in Table 1.

Comparative Example 3

A coating solution was prepared by diluting a silicone polyester varnish (trade name: XR32-A1612 manufactured by Toshiba Silicone Co.; 50% solid content ratio) two times thinner with the use of toluene. 1.0 g/$m^2$of the coating solution was applied to a black-and-white OHP sheet, and dried at 100° C. for 10 minutes in accordance with the same manner as that of Example 2, whereby an image recording member in which a silicone polyester varnish layer had been formed on a substrate was prepared. The coating solution was applied to a PET as in the case of Example 1. A layer thickness and a Knoop hardness number of the resulting layer were 12.5 $\mu$m and 13.3, respectively.

Furthermore, a surface resistivity of the resulting image recording member was $2.1\times10^{10}$ Ω. Image printing was made on this image recording member in accordance with the same manner as that of Example 3, and fixability and image releasability thereof were evaluated. The results obtained are shown in Table 1. While the image forming material was firmly fixed on the image recording member, the image forming material was scarcely released and removed by the same manner as that of Example 1.

Example 7

An image recording member in which a photo-setting type layer had been formed on a substrate was prepared in accordance with the same manner as that of Example 3 except that 0.1 part of a reactive silicone compound (trade name: SIC-434 manufactured by Matsumoto Seiyaku Co.) was added to the photo-setting type silicone coating solution of Example 3. As in the case of Example 3, an image recording member on which the photo-setting type resin layer had been formed on the substrate was prepared by applying the photo-setting type silicone resin coating solution to a PET, and drying and then, light-irradiating the PET thus coated at the same condition as that of Example 3. A layer thickness and a Knoop hardness number of the resulting photo-set film were 7 $\mu$m and 32.6, respectively.

Furthermore, image printing was made on this image recording member in accordance with the same manner as that of Example 3, and fixability and image releasability thereof were evaluated. The results obtained are shown in Table 1.

Example 8

An image recording member in which a photo-setting type resin layer had been formed on a substrate was prepared in accordance with the same manner as that of Example 7 except that a black-and-white OHP sheet was employed in place of a substrate having the same size as that of the OHP sheet. A film thickness and a Knoop hardness number of this photo-setting type silicone resin layer were 7 μm and 39.8. respectively. As a result of measuring a surface resistivity of the image recording member on the layer forming side, it was $6.5\times10^{10}$ Ω. Image printing was made on the image recording member in accordance with the same manner as that of Example 3. and fixability and image releasability thereof were evaluated. The results obtained are shown in Table 1.

Example 9

An image recording member in which a photo-setting type layer had been formed on a substrate was prepared in accordance with the same manner an that of Example 3 except that 0.2 part of methacrylic acid monomer (2% of BPO was added thereto as a catalyst) was added to a photo-setting type silicone coating solution. As in the case of Example 3, an image recording member on which the photo-setting type resin layer had been formed was prepared by applying the photo-setting type silicone resin coating solution to a PET, and drying and then, light-irradiating the PET thus coated at the same condition as that of Example 3. A layer thickness and a Knoop hardness number of the resulting photo-set layer were 10 μm and 12.6, respectively. Furthermore, image printing was made in accordance with the same manner as that of Example 3, and fixability and image releasability thereof were evaluated. The results obtained are shown in Table 1.

Comparative Example 4

A coating solution was prepared by adding 0.44 part of ethanol, 0.02 part of aqueous hydrochloric acid, and 0.35 part of water to 1 part of Methyl triethoxy silane (manufactured by Wakoh Junyaku Co.) as a silicone hard coating agent. 5 ml of the coating solution was applied to a black-and-white OHP sheet manufactured by Fuji Xerox Co., Ltd. the OHP sheet thus coated was dried at room temperature, and then curing reaction was carried out with respect to the coated OHP sheet at 100° C. for 3 hours, whereby an image recording member on which a layer of the silicone hard coating agent was prepared. A layer thickness and a Knoop hardness number of the cured layer were about 1 μm and 150, respectively. Furthermore, a surface resistivity of the image recording member on the layer forming side was $1.8\times10^{12}$ Ω. Printing of an image containing solid image was tried on this image recording member in Vivace 550 machine as in the case of Example 1, but because of poor fixability of the image forming material with respect to the image recording member, there arose an offsetting phenomenon to a fixing roll, so that a sufficient image density could not be obtained.

Example 10

10 parts of polyester resin A (being a copolymer of 40% by weight of bisphenol A, 10% by weight of fumaric acid, and 50% by weight of isopropylene glycol) having an apparent melt viscosity of $1\times10^{3}$ poise at 100° C. were dissolved in 100 parts of methyl ethyl ketone, and to which were added 0.05 part of an alkyl phosphate-base surfactant as a conductive material, and 10 parts of titanium oxide (manufactured by Kanto Kagaku Co.: 0.1 μm average particle diameter) as a white pigment to prepare a resin solution A coating solution was prepared by adding a photo-setting type silicone resin (trade name: UVHC8558 manufactured by Toshiba Silicone Co.) to the resin solution in such that the solid material contained in the resin solution becomes 80% by weight. The resulting coating solution was applied to a polyester film having 100 μm thickness by the use of an applicator, the film thus coated was dried by heating at 100° C. for 10 minutes after air-drying the film and thereafter the layer was photo-set by means of the same light-irradiating device as that of Example 3. whereby an image recording member in which a white photo-set layer had been formed on a substrate was prepared. A layer thickness and a Knoop hardness number of the resulting photo-set layer were 11 μm and 35.2. respectively. Furthermore, fixability and releasability of the image recording member were evaluated in accordance with the same manner as that of Example 3, and the results obtained are shown in Table 1.

Example 11

The image recording member obtained in Example 10 was sandblasted, there after washed sufficiently with pure water and methanol, and dried at 100° C. for 10 minutes, whereby a white image recording member on the surface of which irregularities had been formed was prepared. Furthermore, fixability and releasability of the image recording member were evaluated in accordance with the same manner as that of Example 3, and the results obtained are shown in Table 1.

Example 12

<Coating Solution for Conductive Subbing Layer>

A coating solution for a conductive subbing layer was prepared by agitating sufficiently a mixture of 14.2 parts of a water-dispersed type acrylic resin (trade name: Juimer ET-410 manufactured by Nihon Junyaku Co. Ltd.), 22.5 parts of stannic oxide (trade name: SN-88 manufactured by Ishihara Sangyo Co.), 1.6 parts of an ethylene oxide-base nonionic surfactant (trade name: EMALEX/NP8.5 manufactured by Nihon Emulsion Co.), and 960 parts of pure water.

<Preparation of Conductive White Substrate>

A polyethylene terephthalate film having 100 μm thickness (trade name: Lumilar 100/E20 manufactured by Panac Co.) was subjected to corona discharge treatment, onto which was applied the coating solution for the conductive subbing layer having the above described composition by the use of a wire bar, and the film thus formed was dried at 120° C. for 1 minute, whereby a white film substrate to which the conductive treatment had been subjected was prepared.

The photo-setting type silicone resin coating solution of Example 3 was applied to the above described white film substrate in accordance with the same manner as that of Example 3, the resulting film was dried, and light-irradiated, whereby an image recording member in which a photo-setting silicone resin layer had been formed on the white film substrate was prepared. A layer thickness and a Knoop hardness number of the resulting photo-set layer were 7.3 μm and 31.7, respectively.

Furthermore, fixability and releasability of the image recording member were evaluated in accordance with the same manner as that of Example 3, and the results obtained are shown in Table 1.

Example 13

The image recording member obtained in Example 12 was sandblasted, thereafter washed sufficiently with pure water and methanol, and dried at 100° C. for 10 minutes, whereby a white image recording member on the surface of which irregularities had been formed was prepared. Furthermore, fixability and releasability of the image recording member were evaluated in accordance with the same manner as that of Example 3, and the results obtained are shown in Table 1.

TABLE 1

| | Initial State | | After Repeating 10 Times Recycling | |
|---|---|---|---|---|
| | Fixability (OD ratio) | After Releasing (OD ratio) | Fixability (OD ratio) | After Releasing (OD ratio) |
| Example 1 | 0.85 | 0.06 | 0.82 | 0.07 |
| Example 2 | 0.90 | 0.04 | 0.90 | 0.04 |
| Example 3 | 0.95 | 0.05 | 0.97 | 0.05 |
| Example 4 | 0.96 | 0.03 | 0.95 | 0.03 |
| Example 5 | 0.92 | 0.04 | 0.90 | 0.05 |
| Example 6 | 0.95 | 0.06 | 0.93 | 0.07 |
| Example 7 | 0.92 | 0.02 | 0.89 | 0.03 |
| Example 8 | 0.90 | 0.02 | 0.89 | 0.02 |
| Example 9 | 0.98 | 0.07 | 0.97 | 0.08 |
| Example 10 | 0.92 | 0.04 | 0.90 | 0.05 |
| Example 11 | 0.98 | 0.07 | 0.98 | 0.07 |
| Example 12 | 0.95 | 0.05 | 0.96 | 0.05 |
| Example 13 | 0.99 | 0.06 | 0.99 | 0.06 |
| Comparative Example 1 | — | — | — | — |
| Comparative Example 2 | — | — | — | — |
| Comparative Example 3 | 0.65 | 0.46 | 0.68 | 0.53 |
| Comparative Example 4 | — | — | — | — |

Example 14

<Preparation of Image Recording Material>

An image recording member was prepared on a black-and-white OHP sheet in accordance with the same manner as that of Example 2 except that a thermosetting type Silicone resin (trade name: Tosguard 510 manufactured by Toshiba Silicone Co.) was used, to which 0.5 part of a crosslinking type PMMA matting agent (trade name: MR-2G-20-5 manufactured by Sohken Kagaku Co. Ltd.; average particle diameter: 3 $\mu$m) was added, and the curing temperature was selected to 130° C. A layer thickness and a Knoop hardness number of the thermosetting type silicone resin layer were 3.4 $\mu$m and 80.2. respectively. As a result of measuring a surface resistivity of the image recording member on the layer forming side, it was $3.5\times10^{10}$ Ω. In an electrophotographic image forming machine "Acolor 935" manufactured by Fuji Xerox Co., a color image including solid image was printed on the above described image recording member.

Evaluation of fixability and releasability of an image forming material was made in accordance with the same manner as that of Example 1 (by the modified Vivace 550 machine). For the evaluation of fixability and releasability, process black was employed as the image forming material. Furthermore, since binder resins are different from each other in black-and-white image forming materials and color image forming materials, the viscoelastic behavior thereof differ from each other. For this reason, releasing temperature for color image was determined at 110° C. at which the best result of releasability was attained.

The results obtained are shown in Table 2.

Example 15

<Preparation of Image Recording Material>

An image recording member in which a photo-setting type layer had been formed on a substrate was prepared in accordance with the same manner as that of Example 4 except that a photo-setting type silicone resin (trade name: UVHC1103 manufactured by Toshiba Silicone Co.) was used, and to which 0.5 part of a crosslinking type PMMA matting agent (trade name: MR-2G-20-5 manufactured by Sohken Kagaku Co., Ltd.; average particle diameter: 3 $\mu$m) was added. A layer thickness and a Knoop hardness number of the photo-setting type silicone resin layer were 7.8 $\mu$m and 123.0, respectively. As a result of measuring a surface resistivity of the image recording member on the layer forming side, it was $1.8\times10^{11}$ Ω.

Fixability and releasability of the image recording member were evaluated in accordance with the same manner as that of Example 10, and the results obtained are shown in Table 2.

Example 16

<Preparation of Image Recording Material>

An image recording member in which a photo-setting type layer had been formed on a substrate was prepared in accordance with the same manner as that of Example 4 except that a photo-setting type silicone resin (trade name: UVHC8553 manufactured by Toshiba Silicone Co.) was used, and to which was added 0.5 part of a crosslinking type PMMA matting agent (trade name: MR-2G-20-5 manufactured by Sohken Kagaku Co. Ltd.; average particle diameter: 3 $\mu$m) was added. A layer thickness and a Knoop hardness number of the photo-setting type silicone resin layer were 5.0 $\mu$m and 145. respectively. As a result of measuring a surface resistivity of the image recording member on the layer forming side, it was $2.2\times10^{10}$ Ω.

Fixability and releasability of the image recording member were evaluated in accordance with the same manner an that of Example 4, and the results obtained are shown in Table 2.

TABLE 2

| | Initial State | | After Repeating 10 Times Recycling | |
|---|---|---|---|---|
| | Fixability (OD ratio) | After Releasing (OD ratio) | Fixability (OD ratio) | After Releasing (OD ratio) |
| Example 14 | 0.93 | 0.05 | 0.92 | 0.06 |
| Example 15 | 0.91 | 0.04 | 0.91 | 0.05 |
| Example 16 | 0.89 | 0.05 | 0.88 | 0.04 |

What is claimed is:

1. An image recording member comprising:

a substrate; and a layer comprising a setting type silicone resin that comprises a polysiloxane chain and has a Knoop hardness number of from 1 to 145 formed on a surface of the substrate.

2. The image recording member according to claim 1 wherein said layer containing a setting type silicone resin has a Knoop hardness number of from 10 to 100.

3. The image recording member according to claim 1 wherein said layer a thickness of from 0.1 $\mu$m to 100 $\mu$m.

4. The image recording member according to claim 1 wherein said substrate is selected from the group consisting of paper, plastics, metals, and ceramics.

5. The image recording member according to claim 1 wherein said substrate is a plastic film.

6. The image recording member according to claim 5 wherein said plastic film is transparent.

7. The image recording member according to claim 5 wherein said plastic film is opaque.

8. The image recording member according to claim 5 wherein a surface resistivity ranges from $1\times10^{8}$ to $1\times10^{13}$ Ω.

9. The image recording member according to claim 1 wherein said setting type silicone resin is cured by application of heat, a light beam, or an electron beam.

10. The image recording member according to claim 1 wherein said layer further comprises a modified silicone oil selected from the group consisting of amino-modified silicone oil, epoxy-modified silicone oil, carboxyl-modified silicone oil, carbinol-modified silicone oil, methacryl-modified silicone oil, mercapto-modified silicone oil, phenol-modified silicone oil, dimethyl polysiloxane silicone oil, methylphenyl polysiloxane silicone oil, methyhydrogen silicone oil and fluorine-modified silicone oil.

11. The image recording member according to claim 1 wherein said layer further comprises a matting agent.

12. A process for producing an image recording member comprising the steps of applying a setting type silicone resin precursor on a surface of a substrate, and curing the substrate thus applied to form a layer comprising the setting type silicone resin having a Knoop hardness number of from 1 to 145 on the surface of the substrate, the setting type silicone resin comprising a polysiloxane chain.

13. A method for recycling an image recording member comprising the steps of:

contacting a surface of the image recording member comprising a layer comprising a setting type silicone resin that comprises a polysiloxane chain and has a Knoop hardness number of from 1 to 145 formed on a surface of a substrate, wherein an image has been formed on the surface of the image recording member with an image releasing member and an outermost layer of said image releasing member comprises a material having a higher affinity with an image forming material than that of said image recording member;

heating the material and said image releasing member to transfer said image forming material from said image recording member to said image releasing member; and separating said image recording member from said image releasing member.

14. The method for recycling an image recording member according to claim 13 wherein said image releasing member comprises a covering layer formed on a base material, and an outermost layer of said image releasing member comprises a thermoplastic material or a pressure-sensitive adhesive.

15. The method for recycling an image recording member according to claim 14 wherein the outermost layer of said image releasing member contains fine particles.

16. The method for recycling an image recording member according to claim 14 wherein an elastic layer is formed on the base material of said image releasing member.

17. The method for recycling an image recording member according to claim 16 wherein said elastic layer contains silicone rubber.

* * * * *